(12) United States Patent
Leblanc et al.

(10) Patent No.: US 12,291,906 B2
(45) Date of Patent: May 6, 2025

(54) LATCHING DEVICE AND ACCESSORY FOR VEHICLE

(71) Applicant: SOUCY INTERNATIONAL INC., Drummondville (CA)

(72) Inventors: Etienne Leblanc, Becancour (CA); Normand Roy, St-Hugues (CA); Philippe Jaillet-Gosselin, Drummondville (CA); Vincent Morin, Saint-Hyacinthe (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 211 days.

(21) Appl. No.: 18/133,328

(22) Filed: Apr. 11, 2023

(65) Prior Publication Data

US 2023/0323711 A1 Oct. 12, 2023

Related U.S. Application Data

(60) Provisional application No. 63/330,131, filed on Apr. 12, 2022.

(51) Int. Cl.
*E05C 3/24* (2006.01)
*E05B 85/04* (2014.01)
*E05B 83/16* (2014.01)

(52) U.S. Cl.
CPC .............. *E05C 3/24* (2013.01); *E05B 85/045* (2013.01); *E05B 83/16* (2013.01)

(58) Field of Classification Search
CPC ........... E05C 3/24; E05B 85/045; E05B 83/16
See application file for complete search history.

(56) References Cited

U.S. PATENT DOCUMENTS

| 3,561,802 | A | * | 2/1971 | Brockway | ................. | E05C 3/34 |
| | | | | | | 292/49 |
| 4,703,961 | A | * | 11/1987 | Weinerman | ............... | E05C 3/24 |
| | | | | | | 292/216 |

(Continued)

FOREIGN PATENT DOCUMENTS

EP 2602411 B1 6/2013

OTHER PUBLICATIONS

English abstract of EP 2602411 retrieved from Espacenet on Mar. 14, 2023.

*Primary Examiner* — Mark A Williams
(74) *Attorney, Agent, or Firm* — BCF LLP

(57) ABSTRACT

A latching device for releasably latching to a support member is disclosed. The latching device has a housing with a first lateral wall, a second lateral wall, and a transverse wall extending between the first lateral wall and the second lateral wall. The first lateral wall and the second lateral wall define respective recesses with a first recess portion and a second recess portion. The first recess portion has a first width, and the second recess portion has a second width. The first width is larger than the second width. The first recess portion is configured for guiding the latching device when positioning the latching device relative to the support member. The second recess portion is shaped for receiving the support member when the latching device is latched to the support member. The latching device also has a rotary latching mechanism with a jaw, a pawl, and an actuator.

20 Claims, 12 Drawing Sheets

(56) References Cited

U.S. PATENT DOCUMENTS

| | | | |
|---|---|---|---|
| 4,779,906 A * | 10/1988 | Kurosaki | E05C 19/022 |
| | | | 292/DIG. 4 |
| 5,439,260 A | 8/1995 | Weinerman et al. | |
| 5,586,458 A | 12/1996 | Weinerman et al. | |
| 5,611,224 A | 3/1997 | Weinerman et al. | |
| 5,884,948 A | 3/1999 | Weinerman et al. | |
| 5,984,381 A * | 11/1999 | Yamagishi | E05C 19/022 |
| | | | 292/45 |
| 6,454,321 B1 * | 9/2002 | Parikh | E05C 3/24 |
| | | | 292/216 |
| 6,471,260 B1 * | 10/2002 | Weinerman | E05C 3/24 |
| | | | 292/216 |
| 6,547,302 B1 | 4/2003 | Rubio et al. | |
| 6,651,467 B1 * | 11/2003 | Weinerman | E05B 5/00 |
| | | | 292/216 |
| 6,695,361 B1 | 2/2004 | Gleason et al. | |
| 6,973,810 B2 | 12/2005 | Chen | |
| 7,140,649 B1 * | 11/2006 | Gregory | E05C 9/1875 |
| | | | 292/216 |
| 7,165,790 B2 * | 1/2007 | Bella | E05C 19/022 |
| | | | 292/6 |
| 7,267,380 B2 | 9/2007 | Bullock et al. | |
| 8,876,174 B2 | 11/2014 | Motherwell | |
| 9,188,143 B1 | 11/2015 | Motherwell | |
| 10,815,697 B1 | 10/2020 | Weinerman et al. | |
| 2005/0046200 A1 * | 3/2005 | Dominique | E05B 83/16 |
| | | | 292/216 |
| 2006/0103144 A1 * | 5/2006 | Bullock | E05C 3/24 |
| | | | 292/216 |
| 2023/0286114 A1 * | 9/2023 | Leblanc | B60R 7/08 |

\* cited by examiner

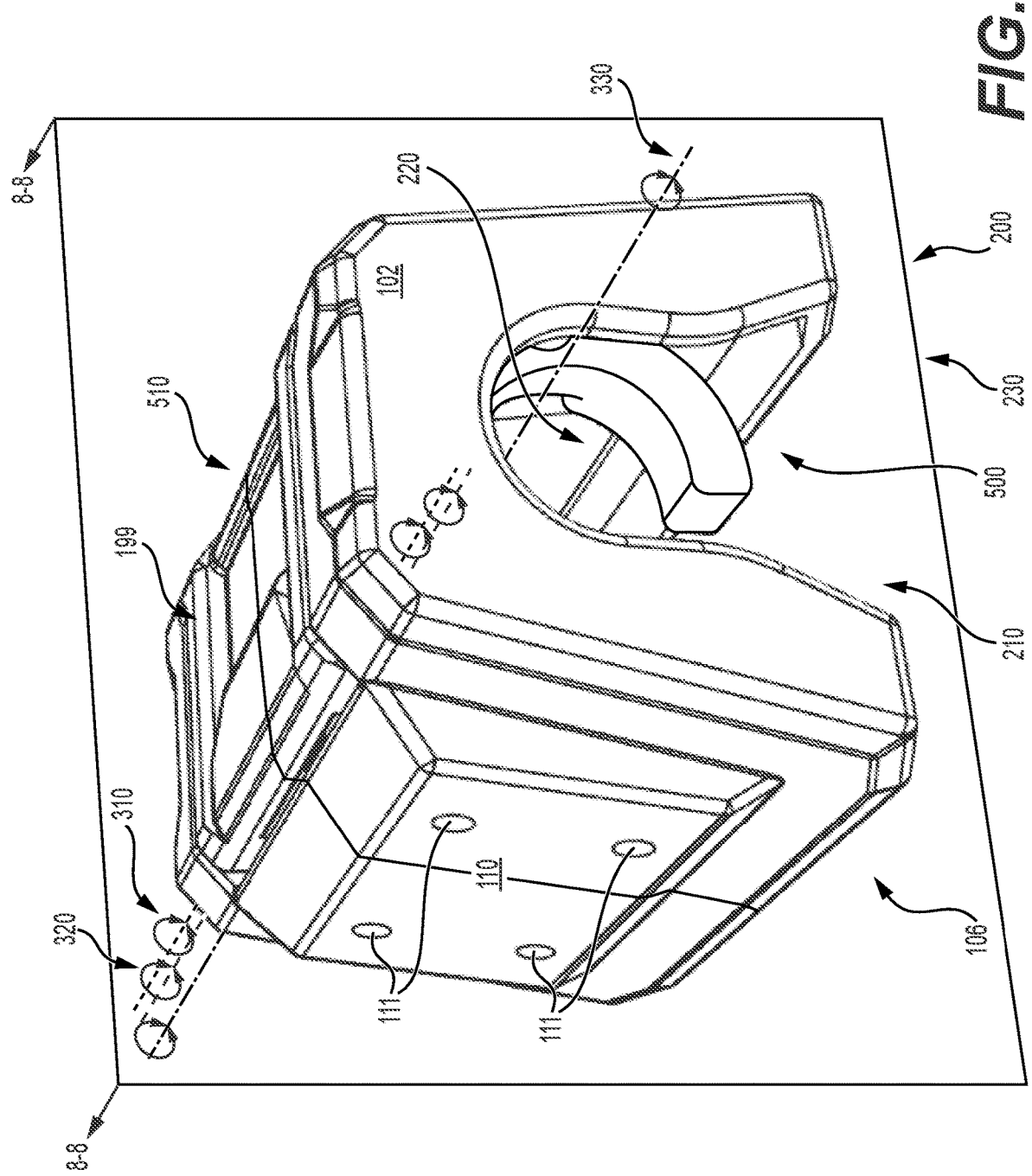

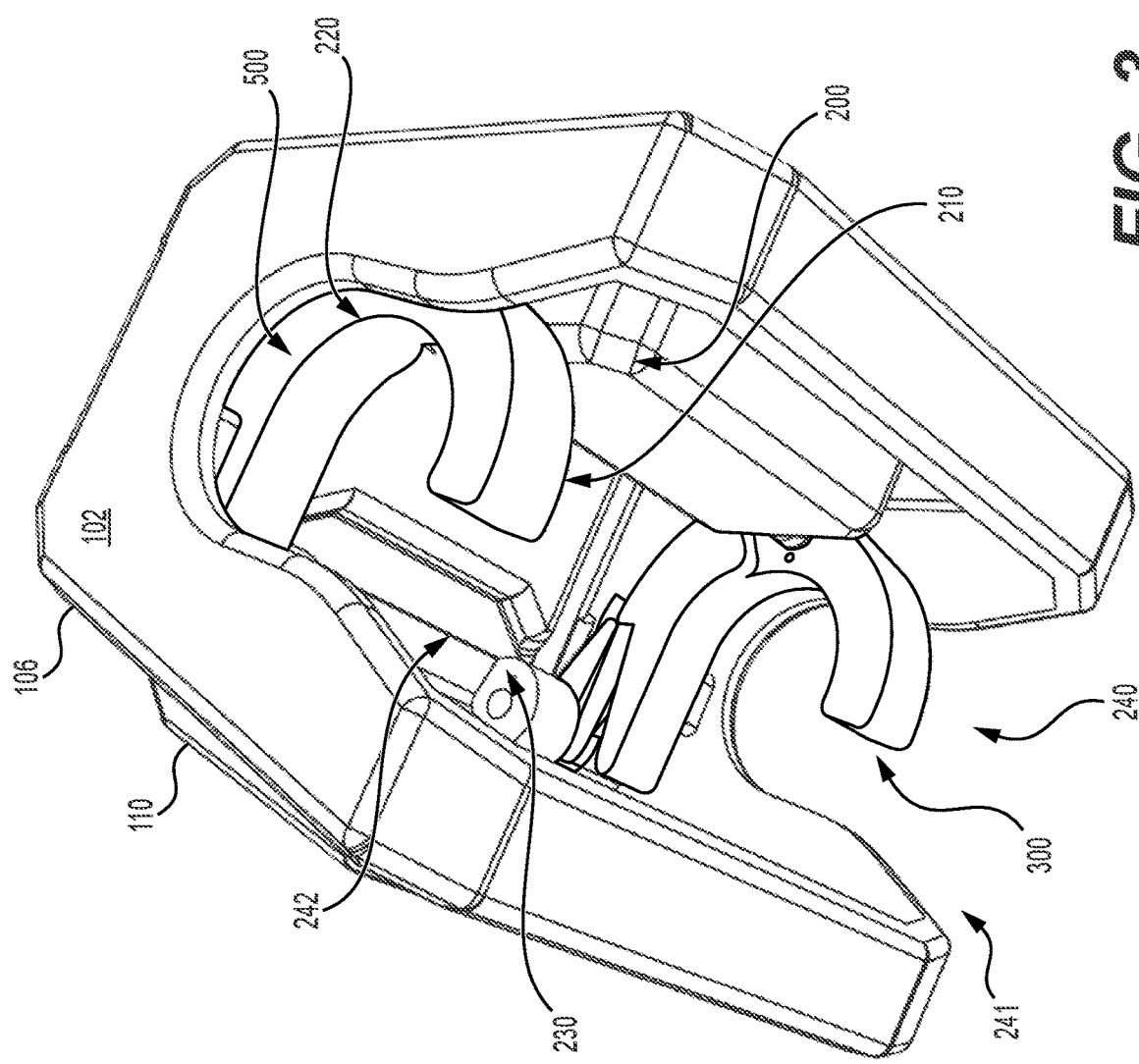

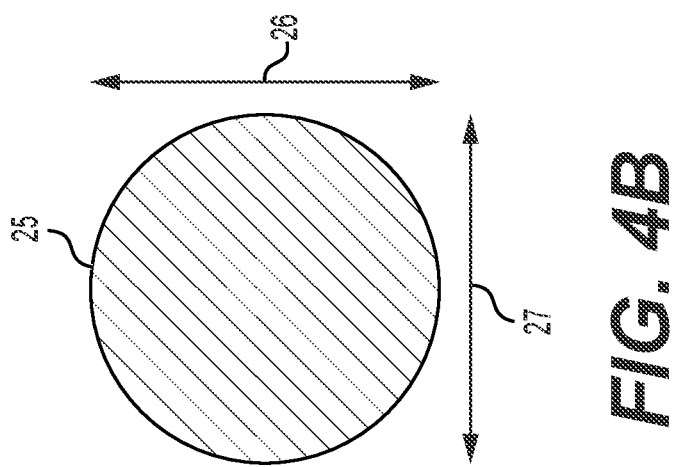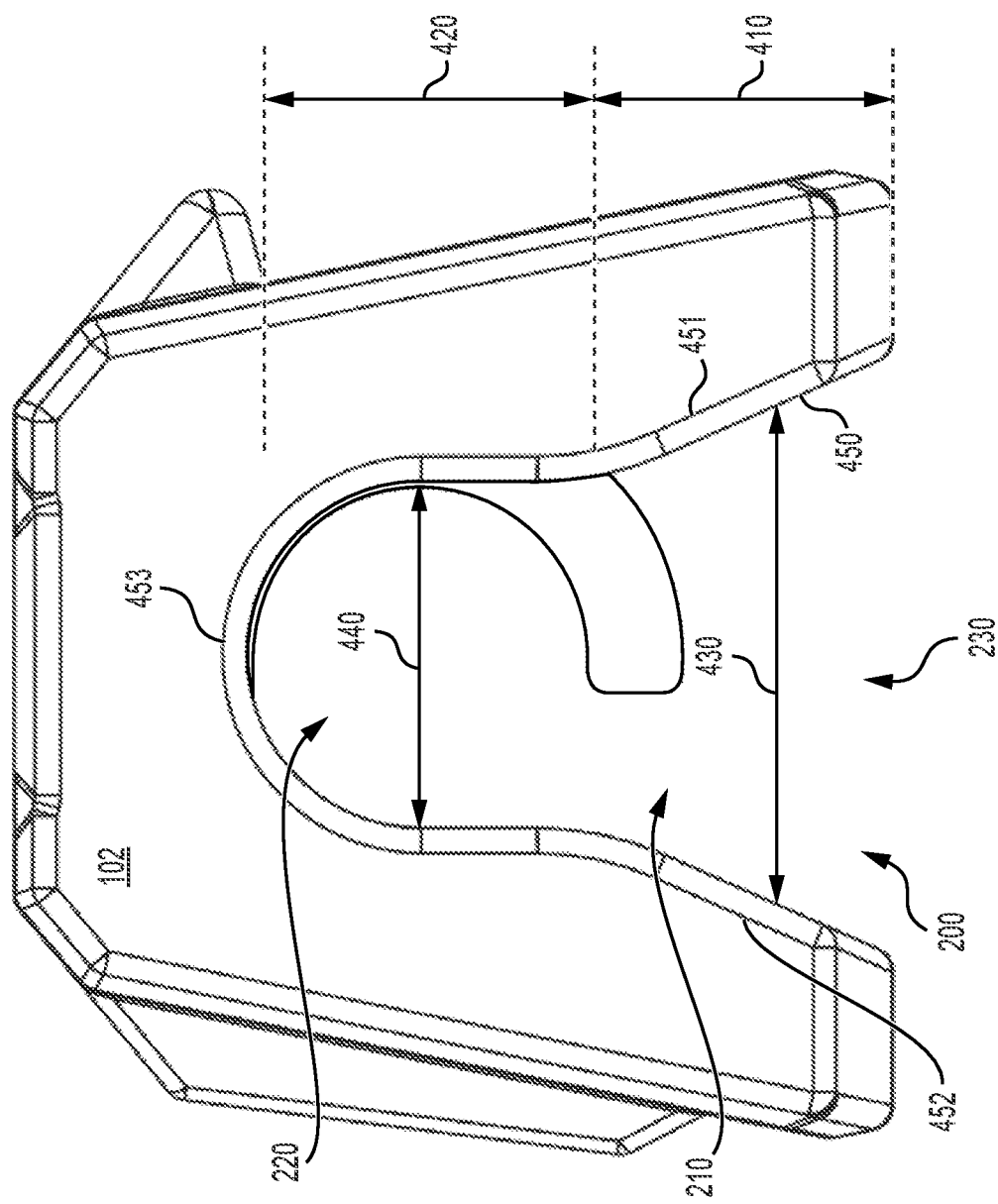

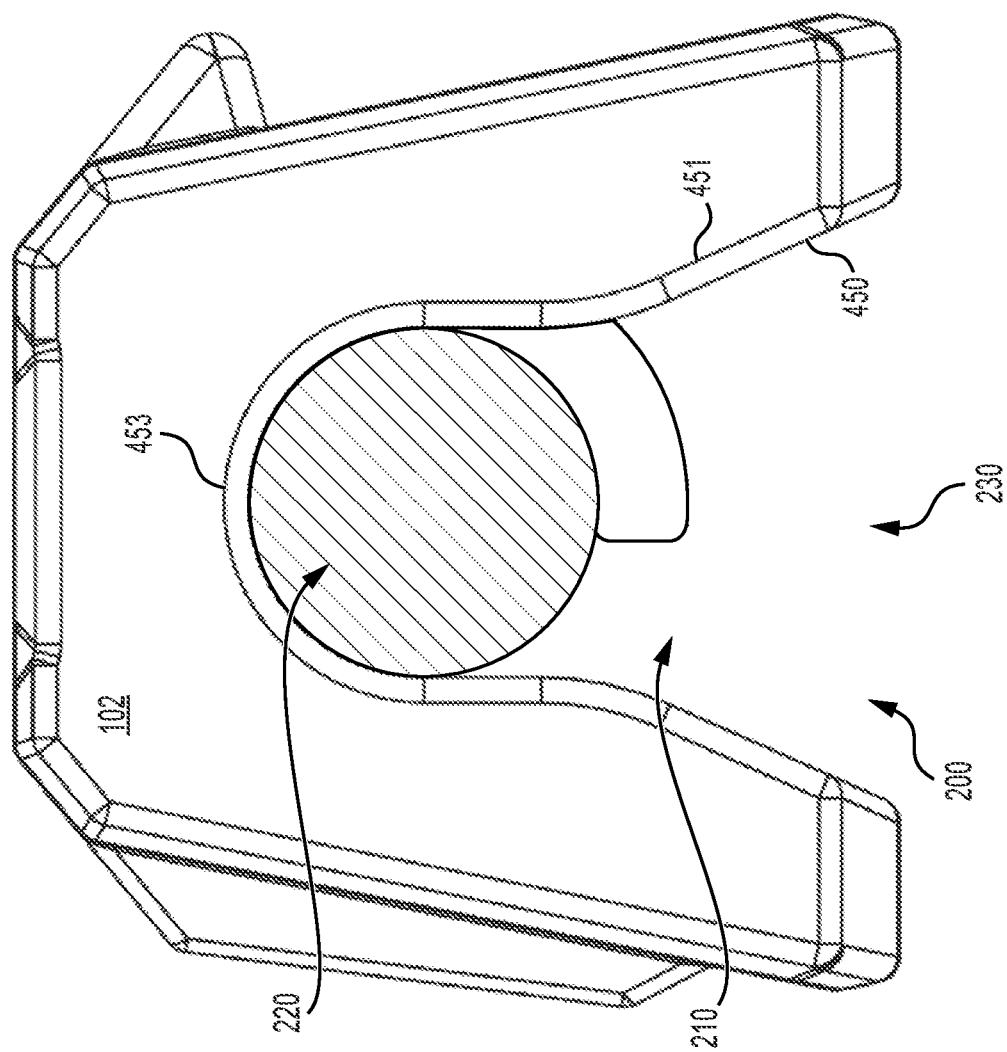

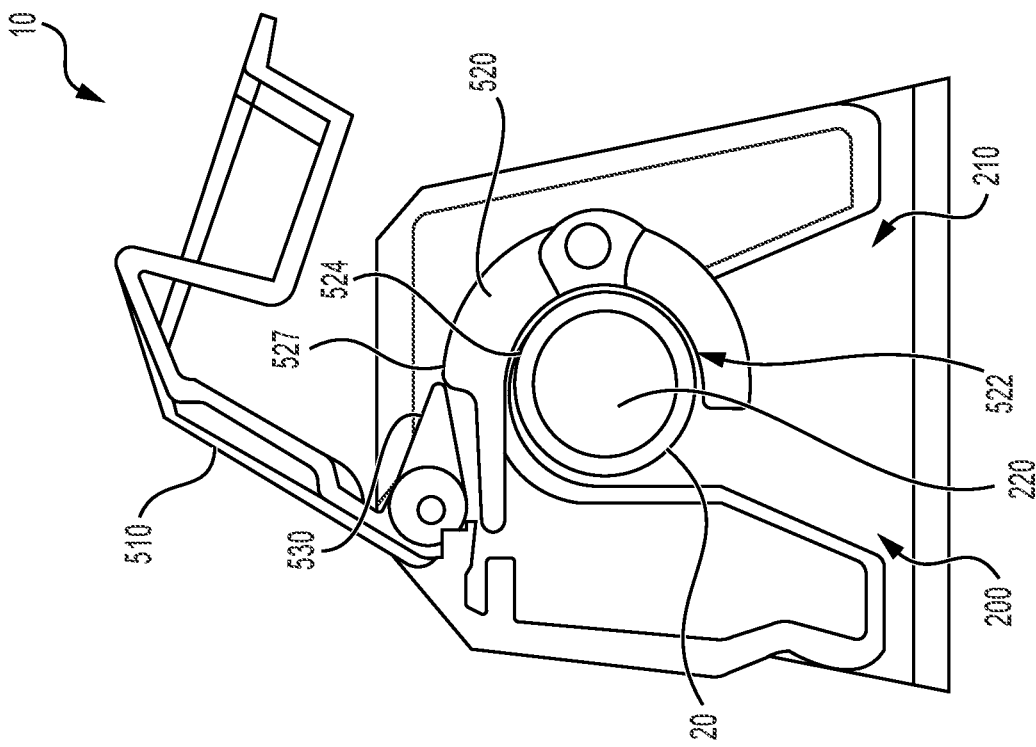
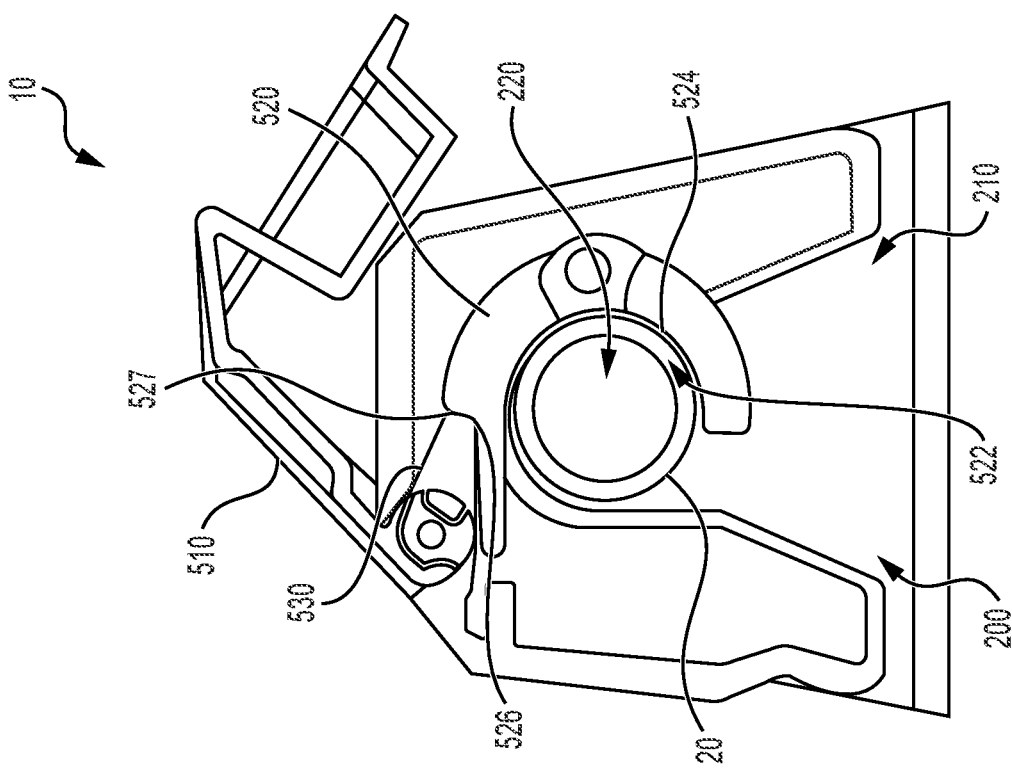

LATCHING DEVICE AND ACCESSORY FOR VEHICLE

CROSS-REFERENCE TO RELATED APPLICATION

This application claims the benefit of and priority to U.S. provisional patent application No. 63/330,131, filed on Apr. 12, 2022; the content of which is herein incorporated in entirety by reference.

TECHNICAL FIELD

The present technology relates to latching devices and accessories for vehicles having latching devices.

BACKGROUND

Rotary latches are used in many applications such as vehicle doors, chests, cabinets, and the like where a lid or door needs to be held or locked in a closed position. Rotary latches are preferred in some applications because they can be designed to spring open upon latch release and may be slammed shut to a closed or locked position. U.S. Pat. No. 7,267,380, incorporated herein by reference, discloses a rotary latch and housing configured to receive a strike.

Conventional rotary latches can be difficult to operate by a human hand. For example, it may be time consuming to connect and disconnect such latches to and from support members, sometimes requiring tools. In addition, conventional rotary latches may not provide an optimal latching condition when significant external forces are applied thereto.

SUMMARY

It is an object of the present technology to ameliorate at least some of the inconveniences present in the prior art.

In the context of the present technology, there is provided a latching device for releasably latching to a support member. The latching device comprises a housing and at least one rotary latching mechanism. The latching device can be used for mounting an accessory to a support member of a vehicle.

In some embodiments, the rotary latching mechanism comprises three rotary components: a rotary jaw, a rotary pawl, and a rotary actuator. Each of the rotary components can be configured to rotate about a respective axis of rotation. It is contemplated that the rotary actuator and the rotary pawl can be configured to rotate about a same axis of rotation. The rotary jaw is configured to move between an opened position and a closed position. The rotary jaw is configured to receive the support member when in the opened position and latch the housing to the support member when in the closed position. The rotary pawl is configured to move between a restraining position and a releasing position. The rotary pawl is configured to catch the rotary jaw (in the closed position) when in the restraining position and release the rotary jaw when in the releasing position. The rotary actuator is configured to move between a secured position and an unsecured position. The rotary actuator is configured to at least partially transfer rotational movement to the rotary pawl for moving the rotary pawl between the restraining and the releasing position.

In some embodiments, the housing has recessed lateral walls, and a transverse wall extending between the recessed walls. Two or more recessed walls are contemplated without departing from the scope of the present technology. Interior space of the housing is accessible from a bottom side of the housing. It can be said that an interior, "channel-like" void is formed in the housing, and which has open ends corresponding to the recesses in the recessed lateral walls. The channel-like void is accessible from the bottom side of the housing. The channel-like void provides room for the at least one latching mechanism and is configured to receive the support member.

In some embodiments, the recesses in the lateral walls have two recess portions, respectively. A leading recess portion is configured to aid in positioning the latching device relative to the support member. It is contemplated that the leading recess portion can be shaped for guiding a human operator during a latching phase of operation. It is also contemplated that the leading recess portion may be provided in a "throat-like" configuration for funneling the support member towards a trailing recess portion of the recess. It is contemplated that the leading recess portions can be shaped for aiding in retaining the latching device on the support member in case of inadvertent unlatching therefrom.

In some embodiments, the trailing recess portion is configured for selectively receiving the support member, such that when the latching device is latched to the support member, the support member is engaged with a recess edge segment of the trailing recess portion. It is contemplated that the recess edge segment can have a complimentary shape to at least some peripheral surface(s) of the support member. Developers of the present technology have realized that providing a housing where the recessed walls are at least partially shaped for engaging with the support member when latched thereto allows transferring a portion of the in-use load applied on the latching device, from the rotary pawl to the housing. Developers of the present technology have realized that providing a housing where the recessed walls are at least partially shaped for engaging with the support member when latched thereto, reduces vibration of the latching device during in-use operation.

In some embodiments, a cavity formed in the rotary jaw has a complimentary shape to at least some peripheral surface(s) of the support member. It is contemplated that a cavity edge of the cavity and the recess edge segment of the trailing recess portion engage with distinct portions of the support member. Distance between a portion of the support member engaging the cavity edge and an other portion of the support member engaging the recess edge segment corresponds to a lateral distance between the cavity edge and the recess edge segment of the latching device.

In some embodiments, when (i) the rotary jaw is in the closed position and the cavity edge engages a first portion of the support member, and (ii) the recess edge segment engages a second portion of the support segment, an increased portion of the peripheral contour of the support element is engaged with the support element, thereby ensuring that the latching condition is securely maintained. In some embodiments, the peripheral contour of the support element engaged with both the cavity edge and the recess edge portion represents three-quarters of a total peripheral contour of the support element.

In some embodiments, the rotary actuator is a tool-less rotary lever. Developers of the present technology have realized that providing the latching mechanism with a rotary lever that is manually operable, and without requiring specialized tools, provides a "quick-action" characteristic to the latching device for aiding the human operator during latching and unlatching phases of operation. Developers of the present technology have realized that providing a rotary actuator, as opposed to a linear actuator for example (i.e., linear actuation movement), reduces the risk of inadvertent unlatching of the latching device during in-use operation.

In some embodiments, the rotary actuator transfers rotational movement to the rotary pawl when moved between positions in a first angular range of movement, and does not transfer rotational movement to the rotary pawl when moved between positions in a second angular range of movement. It is contemplated that an engaging interface between the rotary actuator and the rotary pawl is configured such that when the rotary actuator is moved between the secured position and a pre-determined intermediary position, herein referred to as a "trigger position", the rotary actuator does not transfer rotational movement to the rotary pawl for releasing the rotary jaw. It is also contemplated that the engaging interface is configured such that when the rotary actuator is moved between the trigger position and the unsecured position—i.e., when the rotary actuator is moved beyond the trigger position—the rotary actuator transfers rotational movement to the rotary pawl for releasing the rotary jaw. Developers of the present technology have realized that providing a latching mechanism with such a "play" between the rotary actuator and the rotary pawl reduces the risk of inadvertent unlatching of the latching device from the support member.

In a first broad aspect of the present technology, there is provided a latching device for releasably latching to a support member. The latching device comprises a housing including a first lateral wall, a second lateral wall, and a transverse wall extending between the first lateral wall and the second lateral wall. The first lateral wall and the second lateral wall define respective recesses with a first recess portion and a second recess portion. The first recess portion has a first width and the second recess portion has a second width, and the first width is larger than the second width. The first recess portion is configured for guiding the latching device when positioning the latching device relative to the support member. The second recess portion is shaped for receiving the support member when the latching device is latched to the support member. The latching device comprises a rotary latching mechanism. The rotary latching mechanism includes a rotary jaw disposed in the housing between the first lateral wall and the second lateral wall, the rotary jaw for selectively receiving the support member. The rotary latching mechanism includes a rotary pawl disposed in the housing between the first lateral wall and the second lateral wall, the rotary pawl for selectively engaging the rotary jaw to latch and release the latching device to and from the support member. The rotary jaw is configured to rotate between an opened position and a closed position, and the rotary pawl is configured to rotate between a restraining position and a releasing position. The rotary jaw is disengaged from the rotary pawl when in the opened position and engaged with the rotary pawl when in the closed position. When the rotary pawl is in the restraining position and is engaged with the rotary jaw, the rotary jaw is prevented from moving from the closed position to the opened position. When the rotary pawl is moved from the restraining position to the releasing position, the rotary pawl is disengaged from the rotary jaw thereby allowing the rotary jaw to move from the closed position to the opened position. The rotary latching mechanism includes a rotary actuator for at least partially transferring rotational movement to the rotary pawl. The rotary actuator is configured to rotate from a secured position to an unsecured position. When the rotary actuator is moved from the secured position to the unsecured position, the rotary actuator engages the rotary pawl and at least partially transfers the rotational movement to the rotary pawl, thereby moving the rotary pawl from the restraining position to the releasing position.

In some embodiments of the latching device, the first recess portion tapers from an opening formed by the respective recess towards the second recess portion.

In some embodiments of the latching device, the housing forms a transverse channel having ends corresponding to the respective recesses.

In some embodiments of the latching device, the second recess portion is shaped for snuggly receiving the support member when the latching device is latched to the support member.

In some embodiments of the latching device, the second recess portions have a first height, the support member has a second height, and the first height is at least half of the second height for retaining the latching device on the support member when the latching device is inadvertently unlatched from the support member.

In some embodiments of the latching device, the positioning the latching device relative to the support member is performed by a human operator, and wherein the rotational movement is caused by the human operator.

In some embodiments of the latching device, the second recess portions are formed by respective recess edges of the first lateral wall and the second lateral wall, and the respective recess edges have a complimentary shape to the support member.

In some embodiments of the latching device, the respective recess edges of the first lateral wall and the second lateral wall are covered with a restraining material.

In some embodiments of the latching device, the restraining material is rubber.

In some embodiments of the latching device, the housing further includes a mounting interface for engaging an accessory.

In some embodiments of the latching device, the accessory is at least one of: a storage container, a gas tank, a rack, a vehicle panel, a cab light, a compartment wall, and a luggage bag.

In some embodiments of the latching device, the support member is an elongated member of a vehicle.

In some embodiments of the latching device, the elongated member has a cylindrical shape.

In some embodiments of the latching device, the vehicle is a powersport vehicle.

In some embodiments of the latching device, the rotary jaw is configured to rotate about a jaw rotation axis between the opened position and the closed position. The rotary pawl is configured to rotate about a pawl rotation axis between the restraining position and a releasing position. The rotary actuator is configured to rotate about an actuator rotation axis.

In some embodiments of the latching device, the pawl rotation axis and the actuator rotation axis are a same axis.

In some embodiments of the latching device, the rotary jaw has a notch for selectively engaging with the rotary pawl when in the closed position.

In some embodiments of the latching device, the rotary jaw has a cavity for selectively receiving the support member. The cavity has a cavity edge. When the rotary jaw is in the closed position and a first portion of the support member is received in the cavity and second portions of the support member are received in the respective second recess portions of the first lateral wall and the second lateral wall, the first portion of the support member is engaged with the cavity edge while the second portions of the support member are engaged with the respective ones of the first lateral wall and the second lateral wall.

In some embodiments of the latching device, the cavity edge has a complimentary shape to the first portion of the support member.

In some embodiments of the latching device, when the first portion of the support member is received by the cavity, half of a peripheral surface of the first portion of the support member is engaged with the cavity edge.

In some embodiments of the latching device, the latching mechanism further includes a jaw biasing element for biasing the rotary jaw towards the opened position.

In some embodiments of the latching device, the jaw biasing element is a torsional spring.

In some embodiments of the latching device, the latching mechanism further includes a pawl biasing element for biasing the rotary pawl towards the restraining position.

In some embodiments of the latching device, the pawl biasing element is a torsional spring.

In some embodiments of the latching device, the rotary pawl has a pawl notch, and the rotary actuator has a tab for selectively engaging with the pawl notch. When the rotary pawl is in the restraining position and the rotary actuator is in the secured position, the tab is spaced apart from the pawl notch by a pre-determined distance. When the rotary actuator is moved from the secured position to a trigger position between the secured position and the unsecured position, the tab engages with the pawl notch. When the rotary actuator is moved from the trigger position to the unsecured position, the tab transfers rotational movement caused by the operator, for moving the rotary actuator from the trigger position to the unsecured position, to the rotary pawl. The latching mechanism thereby allows a range of movement of the rotary actuator between the secured position and the trigger position without inadvertently unlatching the latching device from the support member.

In some embodiments of the latching device, the rotary latching mechanism is a first rotary latching mechanism, and the latching device further comprises a second rotary latching mechanism disposed in the housing between the first lateral wall and the second lateral wall.

In some embodiments of the latching device, the first rotary latching mechanism and the second rotary latching mechanism share a same rotary actuator.

In some embodiments of the latching device, the rotary actuator is a tool-less rotary actuator.

In some embodiments of the latching device, the rotary actuator is a rotary lever.

In some embodiments of the latching device, the rotary jaw is a U-shaped rotary jaw.

In a second broad aspect of the present technology, there is provided an accessory for a vehicle. The accessory has a latching device for latching to a support member of the vehicle. The latching device comprises a housing including a first lateral wall, a second lateral wall, and a transverse wall extending between the first lateral wall and the second lateral wall. The first lateral wall and the second lateral wall define respective recesses with a first recess portion and a second recess portion. The first recess portion has a first width and the second recess portion has a second width, and the first width is larger than the second width. The first recess portion is configured for guiding the latching device when positioning the latching device relative to the support member. The second recess portion is shaped for receiving the support member when the latching device is latched to the support member. The latching device comprises a rotary latching mechanism. The rotary latching mechanism includes a rotary jaw disposed in the housing between the first lateral wall and the second lateral wall, the rotary jaw for selectively receiving the support member. The rotary latching mechanism includes a rotary pawl disposed in the housing between the first lateral wall and the second lateral wall, the rotary pawl for selectively engaging the rotary jaw to latch and release the latching device to and from the support member. The rotary jaw is configured to rotate between an opened position and a closed position, and the rotary pawl is configured to rotate between a restraining position and a releasing position. The rotary jaw is disengaged from the rotary pawl when in the opened position and engaged with the rotary pawl when in the closed position. When the rotary pawl is in the restraining position and is engaged with the rotary jaw, the rotary jaw is prevented from moving from the closed position to the opened position. When the rotary pawl is moved from the restraining position to the releasing position, the rotary pawl is disengaged from the rotary jaw thereby allowing the rotary jaw to move from the closed position to the opened position. The rotary latching mechanism includes a rotary actuator for at least partially transferring rotational movement to the rotary pawl. The rotary actuator is configured to rotate from a secured position to an unsecured position. When the rotary actuator is moved from the secured position to the unsecured position, the rotary actuator engages the rotary pawl and at least partially transfers the rotational movement to the rotary pawl, thereby moving the rotary pawl from the restraining position to the releasing position.

In some embodiments of the accessory, the first recess portion tapers from an opening formed by the respective recess towards the second recess portion.

In some embodiments of the accessory, the housing forms a transverse channel having ends corresponding to the respective recesses.

In some embodiments of the accessory, the second recess portion is shaped for snuggly receiving the support member when the latching device is latched to the support member.

In some embodiments of the accessory, the second recess portions have a first height, and the support member has a second height. The first height is at least half of the second height for retaining the latching device on the support member when the latching device is inadvertently unlatched from the support member.

In some embodiments of the accessory, the positioning the latching device relative to the support member is performed by a human operator, and the rotational movement is caused by the human operator.

In some embodiments of the accessory, the second recess portions are formed by respective recess edges of the first lateral wall and the second lateral wall. The respective recess edges have a complimentary shape to the support member.

In some embodiments of the accessory, the respective recess edges of the first lateral wall and the second lateral wall are covered with a restraining material.

In some embodiments of the accessory, the restraining material is rubber.

In some embodiments of the accessory, the housing is integrally formed with the accessory.

In some embodiments of the accessory, the accessory is at least one of: a storage container, a gas tank, a rack, a vehicle panel, a cab light, a compartment wall, and a luggage bag.

In some embodiments of the accessory, the support member is an elongated member of a vehicle.

In some embodiments of the accessory, the elongated member has a cylindrical shape.

In some embodiments of the accessory, the vehicle is a powersport vehicle.

In some embodiments of the accessory, the rotary jaw is configured to rotate about a jaw rotation axis between the opened position and the closed position. The rotary pawl is configured to rotate about a pawl rotation axis between the restraining position and a releasing position. The rotary actuator is configured to rotate about an actuator rotation axis.

In some embodiments of the accessory, the pawl rotation axis and the actuator rotation axis are a same axis.

In some embodiments of the accessory, the rotary jaw has a notch for selectively engaging with the rotary pawl when in the closed position.

In some embodiments of the accessory, the rotary jaw has a cavity for selectively receiving the support member. The cavity has a cavity edge. When the rotary jaw is in the closed position and a first portion of the support member is received in the cavity and second portions of the support member are received in the respective second recess portions of the first lateral wall and the second lateral wall, the first portion of the support member is engaged with the cavity edge while the second portions of the support member are engaged with the respective ones of the first lateral wall and the second lateral wall.

In some embodiments of the accessory, the cavity edge has a complimentary shape to the first portion of the support member.

In some embodiments of the accessory, when the first portion of the support member is received by the cavity, half of a peripheral surface of the first portion of the support member is engaged with the cavity edge.

In some embodiments of the accessory, the latching mechanism further includes a jaw biasing element for biasing the rotary jaw towards the opened position.

In some embodiments of the accessory, the jaw biasing element is a torsional spring.

In some embodiments of the accessory, the latching mechanism further includes a pawl biasing element for biasing the rotary pawl towards the restraining position.

In some embodiments of the accessory, the pawl biasing element is a torsional spring.

In some embodiments of the accessory, the rotary pawl has a pawl notch, and the rotary actuator has a tab for selectively engaging with the pawl notch. When the rotary pawl is in the restraining position and the rotary actuator is in the secured position, the tab is spaced apart from the pawl notch by a pre-determined distance. When the rotary actuator is moved from the secured position to a trigger position between the secured position and the unsecured position, the tab engages with the pawl notch. When the rotary actuator is moved from the trigger position to the unsecured position, the tab transfers rotational movement caused by the operator, for moving the rotary actuator from the trigger position to the unsecured position, to the rotary pawl. The rotary latching mechanism thereby allows a range of movement of the rotary actuator between the secured position and the trigger position without inadvertently unlatching the latching device from the support member.

In some embodiments of the accessory, the rotary latching mechanism is a first rotary latching mechanism, and the latching device further comprises a second rotary latching mechanism disposed in the housing between the first lateral wall and the second lateral wall.

In some embodiments of the accessory, the first rotary latching mechanism and the second rotary latching mechanism share a same rotary actuator.

In some embodiments of the accessory, the rotary actuator is a tool-less rotary actuator.

In some embodiments of the accessory, the rotary actuator is a rotary lever.

In some embodiments of the accessory, the rotary jaw is a U-shaped rotary jaw.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 2 is a perspective view taken from a top, back, right side of the latching device of FIG. 1.

FIG. 3 is a perspective view taken from a bottom, back, right side of the latching device of FIG. 1.

FIG. 4A is a right-side elevation view of the latching device of FIG. 1A.

FIG. 4B is a cross-sectional view of the support member of FIG. 1B.

FIG. 4C is the right-side elevation view of the latching device of FIG. 1A and a cross-sectional view of the support member of FIG. 1B when the latching device is latched to the support member.

FIG. 7C is a cross-sectional view of the latching device of FIG. 7A when the latching device is latched to the support member and a rotary actuator of the latching device is in a first position between a secured position and a target position.

FIG. 7D is a cross-sectional view of the latching device of FIG. 7A when the latching device is latched to the support member and the rotary actuator of the latching device is in the target position.

DESCRIPTION OF EMBODIMENTS

Figure 1A:
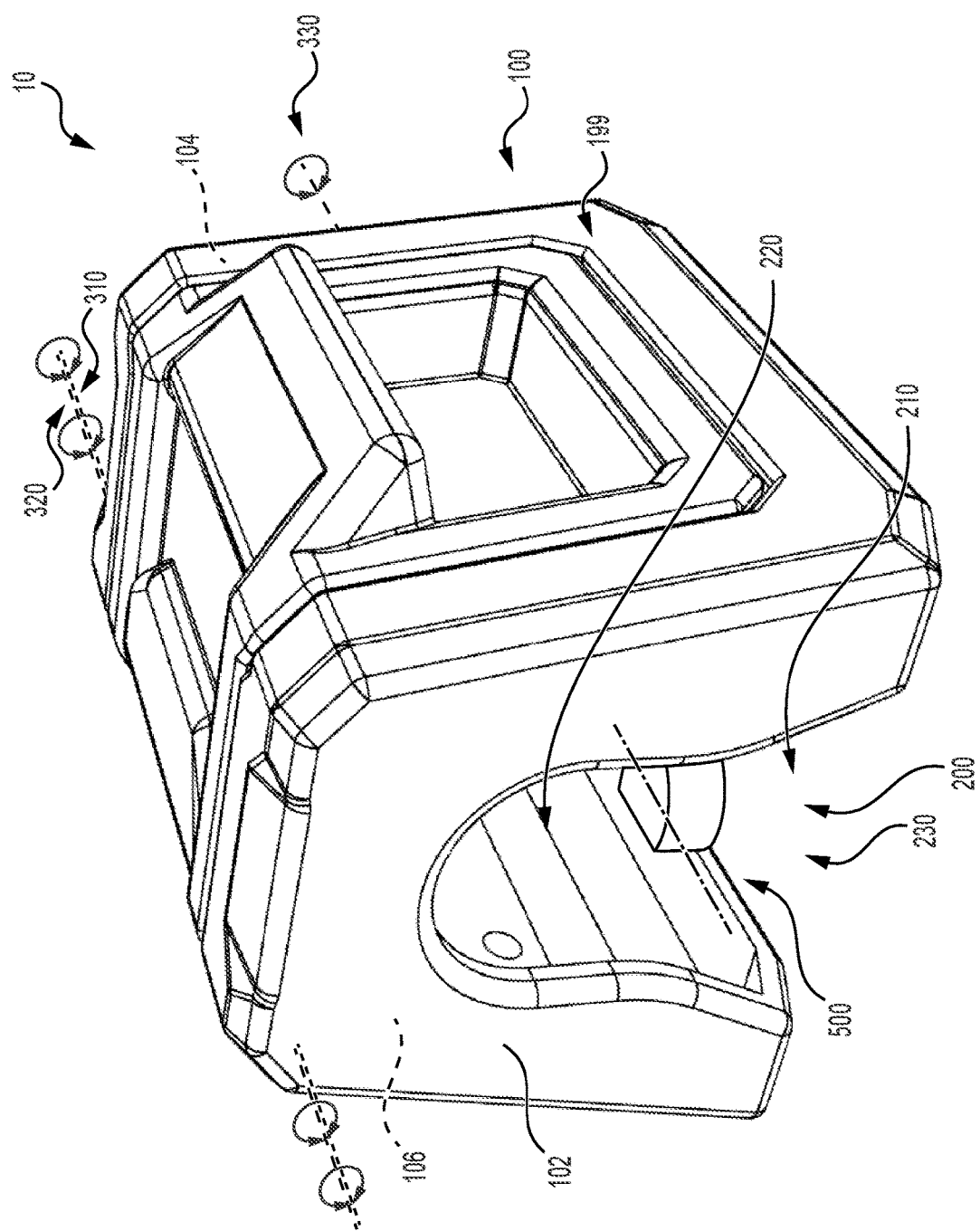
FIG. 1A is a perspective view taken from a top, front, right side of an embodiment of a latching device.
Figure 1B:
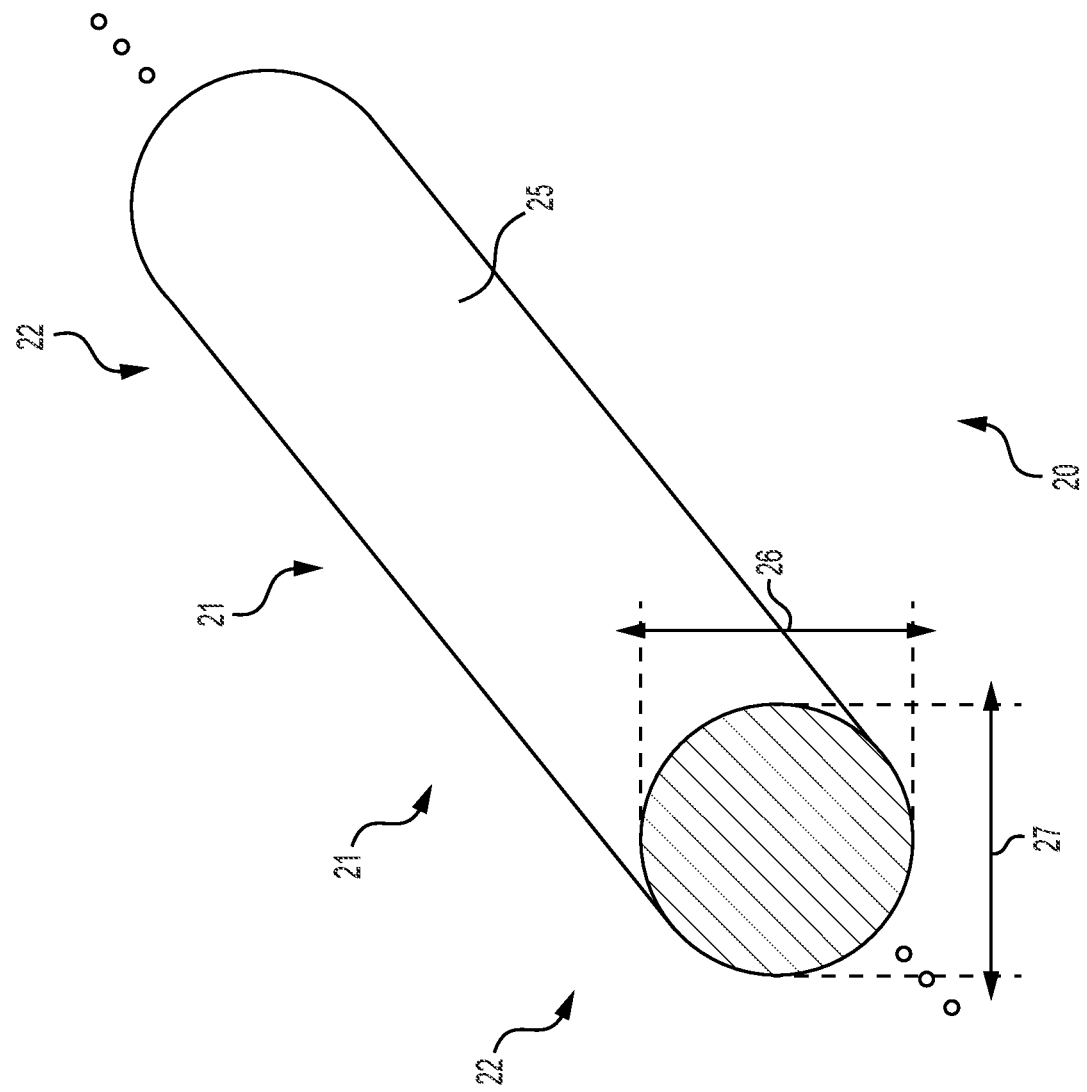
FIG. 1B is a perspective view taken from a top, front, right side of an embodiment of a support member.

The present disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including", "comprising", or "having", "containing", "involving" and variations thereof herein, is meant to encompass the items listed thereafter as well as, optionally, additional items. In the following description, the same numerical references refer to similar elements.

In the context of the following description, "outwardly" or "outward" means away from a longitudinal center plane of the mounting clamp, and "inwardly" or "inward" means toward the longitudinal center plane. In addition, in the context of the following description, "longitudinally" means in a direction parallel to the longitudinal center plane of the mounting clamp in a plane parallel to flat level ground, "laterally" means in a direction perpendicular to the longitudinal center plane along a width of the mounting clamp, and "generally vertically" means in a direction contained in the longitudinal center plane along a height direction of the mounting clamp. Note that in the Figures, a "+" symbol is used to indicate an axis of rotation. In the context of the present technology, the term "axis" may be used to indicate an axis of rotation. Also, the term "pivot" includes all the necessary structure (bearing structures, pins, axles and other components) to permit a structure to pivot/rotate about an axis, as the case may be.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

It must be noted that, as used in this specification and the appended claims, the singular form "a", "an" and "the" include plural referents unless the context clearly dictates otherwise.

As used herein, the term "about" in the context of a given value or range refers to a value or range that is within 20%, preferably within 10%, and more preferably within 5% of the given value or range.

As used herein, the term "and/or" is to be taken as specific disclosure of each of the two specified features or components with or without the other. For example, "A and/or B" is to be taken as specific disclosure of each of (i) A, (ii) B and (iii) A and B, just as if each is set out individually herein.

With reference to FIGS. 1A, 1B, 2 and 3, there is depicted a latching device in accordance with one embodiment of the present technology. The latching device 10 is configured for releasable latching onto a support member 20. As it will become apparent from the description herein further below, the latching device 10 is a "quick-action" latching device for releasably connecting one or more accessories to the support member without the need for additional fasteners.

The support member 20 has a width 27, a height 28, and a peripheral surface 25. In this embodiment, the support member 20 is an elongated member having a cylindrical shape. It can be said that the support member 20 has a circular cross-section and such that the width 27 is equal to the height 28.

In other embodiments, a given support member may have different sizes (width and height) and shapes. For example, the given support member may be an elongated member with a rectangular, square, pentagonal, hexagonal, and octagonal cross-section. Hence, it is contemplated that the given support member may have more than one peripheral surfaces, without departing from the scope of the present technology.

When the latching device 10 is releasably latched to the support member 20, first portions 21 of the support member 20 engage first components of the latching device 10, and second portions 22 of the support member 20 engage second components of the latching device 10. As it will become apparent from the description herein further below, irrespective of a specific shape of a given support member, one or more components of a given latching device as envisioned in the present technology is/are configured to match or complement that specific shape of the given support member.

The support member 20 is a structural component of a vehicle (not depicted). In one embodiment, the support member 20 may be a structural component of a powersport vehicle (e.g., a snowmobile, a quad, a ATV, a Side-by-Side, a UTV, a cross-country motorcycle, and the like) configured to support one or more accessories that a human operator wishes to releasably latch to that vehicle. The specific location of the support member 20 on the vehicle is not particularly limiting. For example, the support member 20 may be provided near a front portion of the vehicle (e.g., handlebars), near a middle portion of the vehicle (e.g., frame), and near a rear portion of the vehicle (e.g., a rear cabin). It is understood that the support member 20 may be a structural component of other types of vehicles, such as agricultural, industrial, military, and exploratory vehicles for instances.

Returning to the description of the latching device 10, the latching device comprises a housing 100, as well as a first rotary latching mechanism 500 and a second rotary latching mechanism 300 disposed inside the housing 100.

In this embodiment, the latching device 10 is symmetrical with respect to a longitudinal center plane 8-8 (see FIG. 2). In other words, a portion of the latching device on one side of plane 8-8 is a mirror image of a portion of the latching device 10 on the other side of the plane 8-8. This also means that the first rotary latching mechanism 500 is a mirror image of the second rotary latching mechanism 300.

It should be noted that non-symmetrical latching devices are also contemplated. Also, although the latching device 10 has two rotary latching mechanisms, this may not be the case in each and every embodiment of the present technology. It is contemplated that a given latching device may comprise a single, or more than one, rotary latching mechanism(s) without departing from the scope of the present technology.

The housing 100 includes a first lateral wall 102, a second lateral wall 104, and a transverse wall 106 extending between the first and second lateral walls 102, 104. In this embodiment, the housing 100 defines an aperture 199 for accommodating a component of the first rotary latching mechanism 500 when the component is in a secured position.

The first lateral wall 102 defines a recess 200 having a first recess portion 210 and a second recess portion 220. The first recess portion 210 and the second recess portions 220 have different widths and are shaped for respective purposes. As it will be described in greater detail herein further below with reference to FIG. 4, the purpose of the first recess portion 210 is to guide the latching device 10 when positioning the latching device 10 relative to the support member 20 by a human operator, while the purpose of the second recess portion 220 is to receive the support member 20 when the latching device 10 is latched to the support member 20.

As mentioned above, the second lateral wall 104 is a mirror image of the first lateral wall 102. Therefore, the second lateral wall 104 also defines a recess with a first and second portions, similarly to the recess 200 of the first lateral wall, and will not be described in greater detail for sake of brevity.

The housing 100 having recessed lateral walls forms a transverse channel 240 (best seen on FIG. 3), thereby creating room in the housing 100 for releasably receiving the support member 20 and at least some components of the first and second rotary latching mechanisms 500, 300. The transverse channel 240 has open ends 241 and 242 (that correspond to the recess 200 of the first lateral wall 102 and a recess of the second lateral wall 104, respectively.

Figure 8:
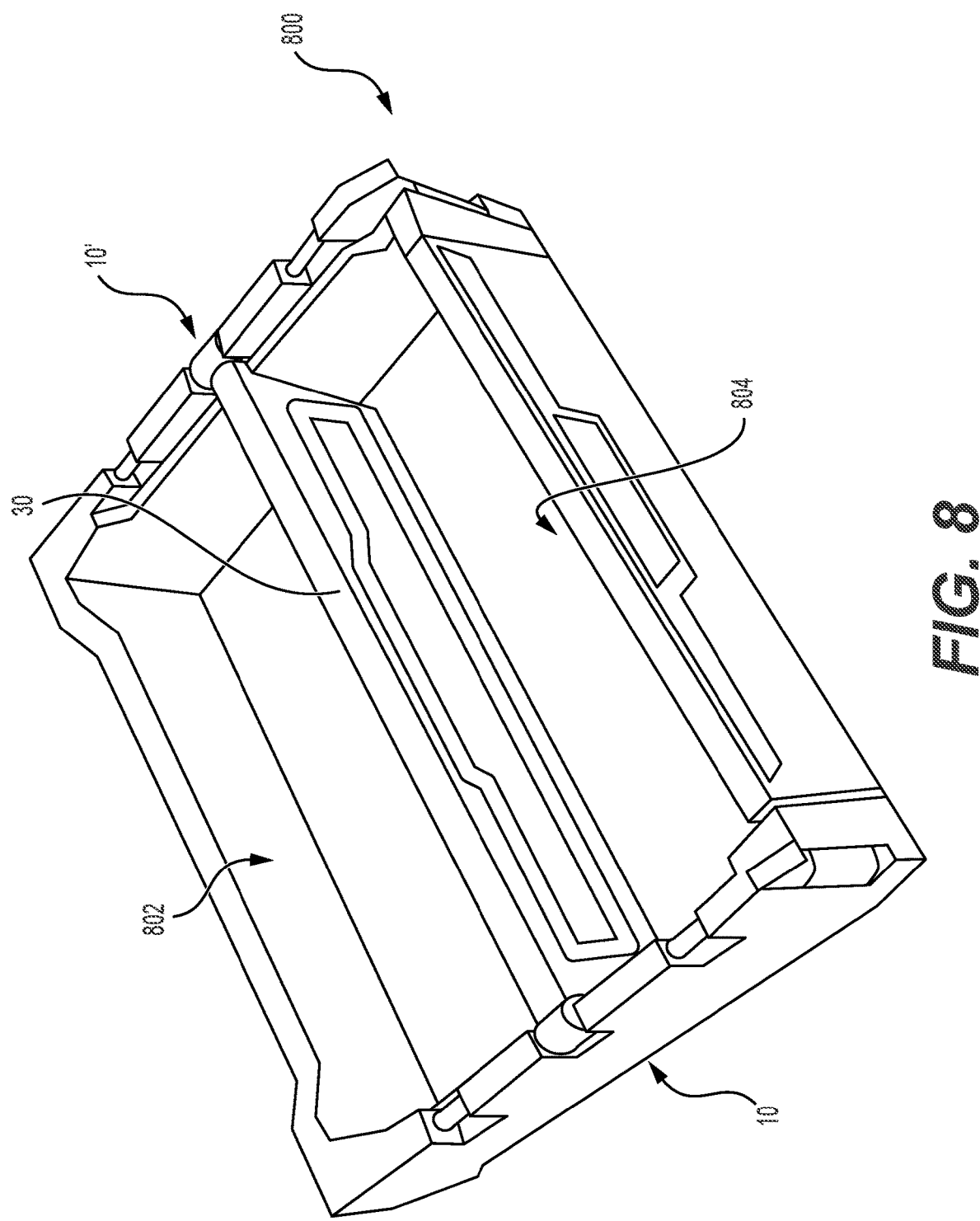
FIG. 8 depicts an accessory with the latching device of FIG. 1

The housing 100 includes a mounting interface 110 for engaging an accessory 30 (see FIG. 8). The mounting interface 110 is disposed on the transverse wall 106. It is contemplated that the mounting interface 110 may be disposed elsewhere on the housing 100 (e.g., other walls and/or surfaces) without departing from the scope of the present technology.

The mounting interface 110 defines two pairs of laterally spaced apertures 111 configured to receive respective fasteners (not shown). It can thus be said that the accessory 30 may be fastened to the housing 100. In other embodiments, the mounting interface 110 could be configured to engage with and connect to the accessory 30 differently, such as, for instance, with an adhesive. It is contemplated that the accessory 30 and the latching device 10 could be unitary or integrally formed. For instance, the housing can be integrated to the accessory 30 or may be a component of the accessory 30. It is also contemplated that the accessory 30 may be provided with one or more latching device(s) as a kit. The latching device 10 may also be provided as a stand-alone component for connection to the accessory 30, without departing from the scope of the present technology.

Multiple types of accessories are contemplated in the present technology. In FIG. 8, the accessory 30 is a compartment wall for separating a storage space 800 into two compartments 802, 804. In other embodiments, a given accessory may be a toolbox, a storage container, a gas tank, a rack, a vehicle panel, a cab light, a luggage bag, a gun case, a camera, a chainsaw, a shovel, and/or any accessory to be mounted on a vehicle. The accessory 30 is configured to connect to the latching device 10, and an other latching device 10'. The accessory 30 is configured to connect to two support members (not numbered) via corresponding latching devices 10, 10'. However, other accessories may be configured to connect to one or more support member by means of one or more latching devices.

With reference to FIG. 4A, there is depicted a right elevation view of the latching device 10. As mentioned above, the first lateral wall 102 defines the recess 200 with the first recess portion 210 and the second recess portion 220. The first lateral wall 102 has a recess edge 450 that shapes the recess 200. The recess edge 450 has a first edge segment 451, a second edge segment 452, and a third edge segment 453. The first recess portion 210 has a first width 430, while the second recess 220 has a second width 440.

The first and third edge segments 451, 453 define the first recess portion 210. In this embodiment, the first and third edge segments 451, 453 form a throat-shaped recess portion that is wider near an opening 230 of the recess 200 than near the second portion 220. It can be said that the first recess portion 210 tapers from the opening 230 formed by the recess 200 towards the second recess portion 220. The tapering profile of the first recess portion 210 may aid the human operator when funneling the support member 20 into the recess 200. In some embodiments, it can be said that the first and third edge segments 451, 453 are guiding edges of the recess edge 450.

With reference to both FIGS. 4A and 4B, the first recess portion 210 has a first height 410 that is longer than the height 26 of the support member 20. However, it should be noted that the first height 410 and a tapering angle (not depicted) of the first and third edge segments 451, 453 relative to a vertical axis can be varied depending on inter alia different implementations of the present technology. Developers of the present technology have realized that throat-shaped configurations with different heights and tapering angles may be used depending on a specific shape and size of a given support member to which the latching device 10 is to be releasably latched.

In some embodiments of the present technology, it can be said that a given recess of a lateral wall may have a leading recess portion configured to guide the latching device 10 when being positioned relative to the support member 20. The leading recess portion may have a throat-shaped configuration for funneling the support member 20 towards the second recess portion 220.

As mentioned above, the second edge segment 452 defines the second recess portion 220. It should be noted that the second width 440 of the second recess portion 220 is smaller than the first width 430 of the first recess portion 210. The second recess portion 220 is configured to selectively receive the support member 20.

It should be noted that in this embodiment, the second edge segment 452 is an arcuate segment of the recess edge 450 with an arc radius that is complementary to a radius of the support member 20. As best seen on FIG. 4C, in this embodiment, the second recess portion 220 is shaped for snuggly receiving the support member 20 when the latching device 10 is latched to the support member 20.

Although in this embodiment the second edge segment 452 has an arcuate shape, this may not be the case in each and every embodiment of the present technology. In other embodiments, where a given support member has a differently shaped cross-section (e.g., not circular), the second edge segment 452 may have a different corresponding complimentary shape. For example, if the given support member has a square cross-section, the second edge segment 452 may have two right angles for complimenting the square cross-section of that given support member.

In at least some embodiments of the present technology, the second edge segment 453 may be covered with a layer of restraining material, such as rubber for example, for aiding in preventing inadvertent movement (e.g. sliding, vibration, etc.) of the latching device 10 relative to the support member 20 when the latching device 10 is latched thereto.

The second recess portion 220 has a height 420. The height 420 is equal to the height 26 of the support member 20. In other embodiments, the height of a recess portion may be half the height of a given support member. This may aid in retaining the latching device 10 on the support member 20 when the latching device 10 is inadvertently unlatched from the support member 20, because at least a portion of the support member may still be engaged with the second edge segment 452 even if the latching device 10 is inadvertently unlatched. In other embodiments, the height of the second recess portion 220 may be more, or less than half of the height 26 of the support member 20 and which may depend on a specific shape and size of the support member 20.

As best seen in FIG. 4C, half of a peripheral contour of the support member is engaged with the second edge segment 453 when the support member 20 is received in the second recess portion 220. In other embodiments, more or less than half of the peripheral contour of the support member 20 may be engaged with the second recess segment 453 when received in the second recess portion 220, and which may depend on a specific shape and size of the support member.

As it will be described in greater detail herein further below, when the support member 20 is received in the second recess portion 220, the second edge segment 452 may cooperate with a component of the rotary latching mechanisms 500 for optimizing the latching condition of the latching device 10. Indeed, when the latching device 10 is latched to the support member 20, in addition to a portion of the peripheral contour of the support member 20 that is engaged with the second edge segment 452, an additional portion of the peripheral contour of the support member 20 is engaged with the component of the first rotary latching mechanism 500. As seen in FIG. 4C, more than three-quarters of the peripheral contour of the support member 20 is engaged with the latching device 10 when the latching device 10 is latched to the support member 20.

In some embodiments of the present technology, it can be said that a given recess of a lateral wall may have a trailing recess portion configured to receive the support member 20. The trailing recess portion of the recess may be a portion of the given recess towards which the leading recess portion funnels the support member 20.

Figure 5:
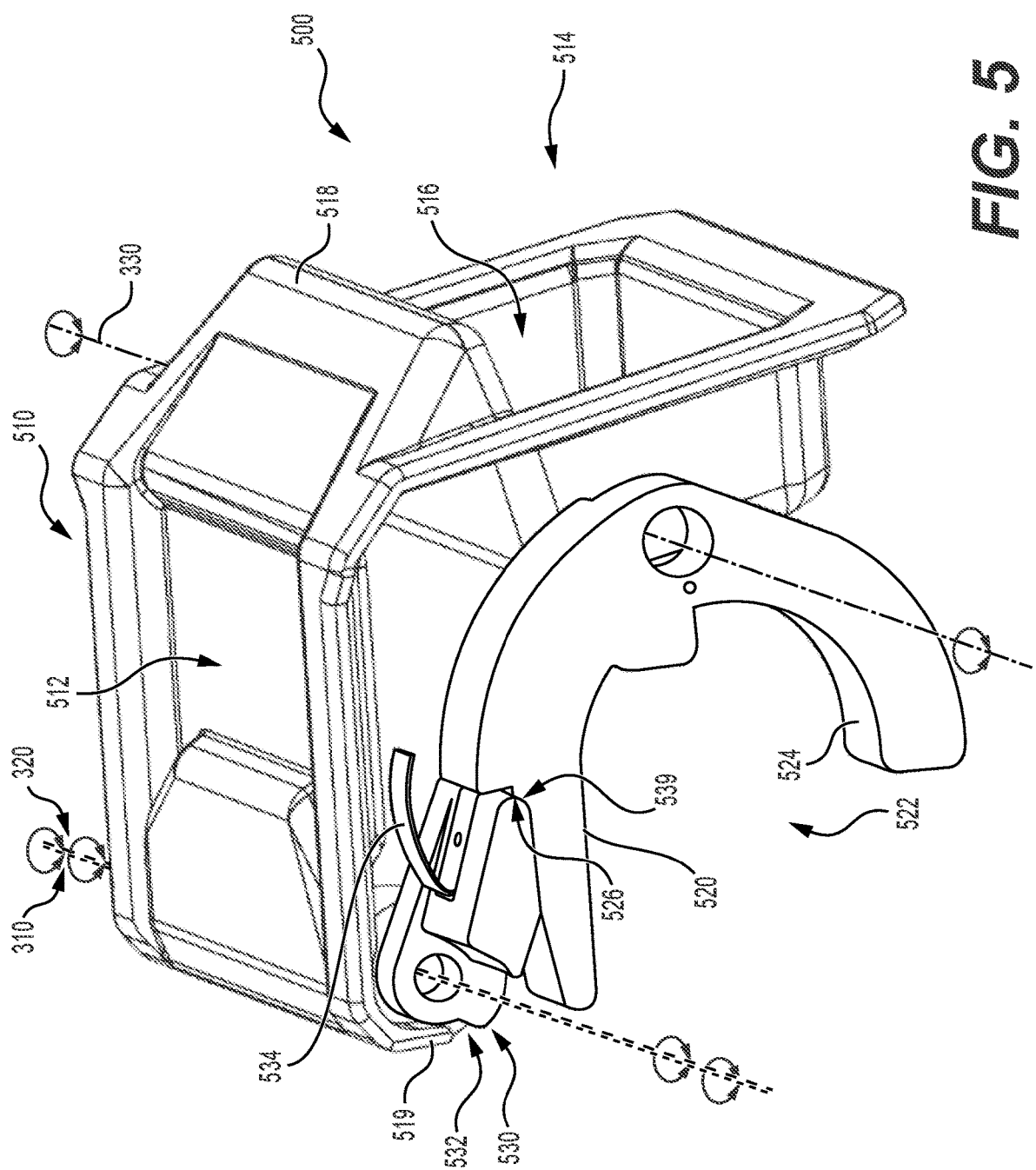
FIG. 5 is a perspective view taken from a top, front, right side of the latching device of FIG. 1 without a housing thereof.
Figure 6:
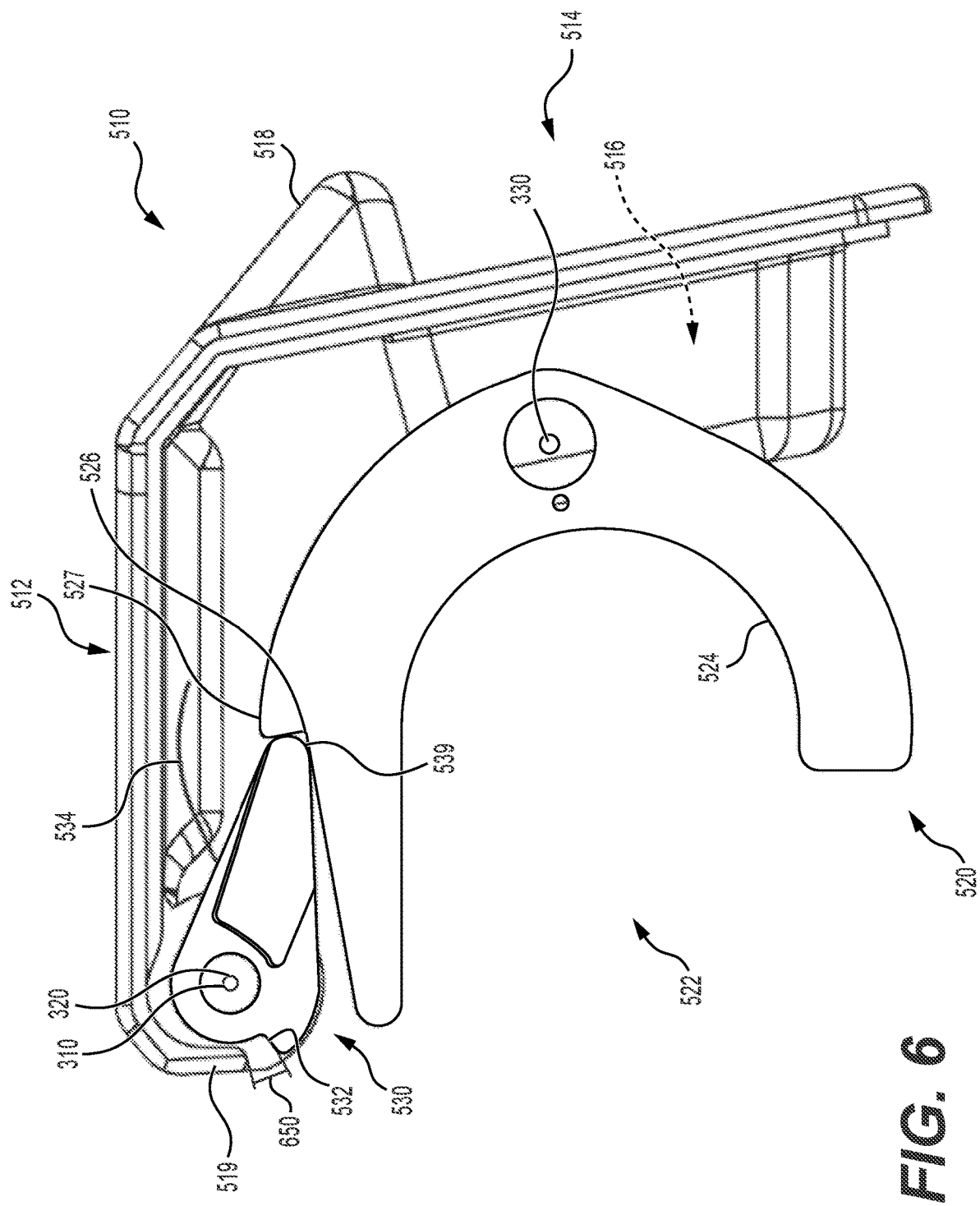
FIG. 6 is a right-side elevation view of the latching device of FIG. 5.

With reference to FIGS. 5 and 6, there is depicted the latching device 10 without the housing 100. The first latching mechanism 500 has a rotary jaw 520, a rotary pawl 530, and a rotary actuator 510, and which will now be described in turn. However, it should be noted that the second latching mechanism 300 is a mirror image of the first latching mechanism 500 and thus will not be described in greater detail for sake of brevity. In this embodiment, the first and the second latching mechanisms 500, 300 share a same rotary actuator, but this does not need to be the in case in other embodiments of the present technology. In some embodiments, the first and the second latching mechanisms 500, 300 share a same rotary jaw and/or a same rotary pawl.

The rotary jaw 520 is disposed in the housing 100 between the first and second lateral walls 102, 104. The rotary jaw 520 is configured to selectively receive the support member 20. The rotary jaw 520 has a cavity 522 defined by a cavity edge 524. As it will be discussed in greater detail herein further below, the cavity 522 may be used to receive the support member 20 such that the support member 20 engages the cavity edge 524. The rotary jaw 520 is a "u-shaped" rotary jaw, meaning that the cavity edge 524 is u-shaped, however other shapes are contemplated for the rotary jaw 520 of the latching mechanism 500 without departing from the scope of the present technology. In one embodiment, the cavity edge 524 may have an arcuate shape and size that is complimentary to the shape and size of the support member 20.

The rotary jaw 520 is configured to rotate about a jaw rotation axis 330 between an opened position (see FIG. 7A) and a closed position as seen in FIGS. 5 and 6. In this embodiment, the rotary jaw 520 has a notch 526 and a corner member 527 for selectively engaging with a tip 539 of the rotary pawl 530 when in the closed position. In some embodiments, the first latching mechanism 500 may have a jaw biasing element, such as a torsional spring, for example, for biasing the rotary jaw 520 towards the opened position. Other jaw biasing elements are also contemplated.

The rotary pawl 530 is disposed in the housing 100 between the first and second lateral walls 102, 104. The rotary pawl 530 is configured to selectively engage the rotary jaw 520 (and more particularly the notch 526) to latch and release the latching device 10 to and from the support member 20. The rotary pawl 530 is configured to rotate about a pawl rotation axis 320 between a restraining position as seen in FIGS. 5 and 6 and a releasing position (see FIG. 7E). The latching mechanism 500 includes a pawl biasing element 534 for biasing the rotary pawl 530 towards the restraining position. For example, the pawl biasing element 534 may be a torsional spring, but other biasing elements are also contemplated.

The rotary actuator 510 is configured to at least partially transfer rotational movement to the rotary pawl 530. The rotary actuator 510 is configured to rotate about an actuator rotation axis 510. In this embodiment, the actuator rotation axis 310 and the pawl rotation axis 320 coincide. It can be said that both the rotary actuator 510 and the rotary pawl 530 are configured to rotate about a same axis. However, the rotary actuator 510 and the rotary pawl 530 may be configured to rotate about separate axes without departing from the scope of the present technology.

Figure 7B:
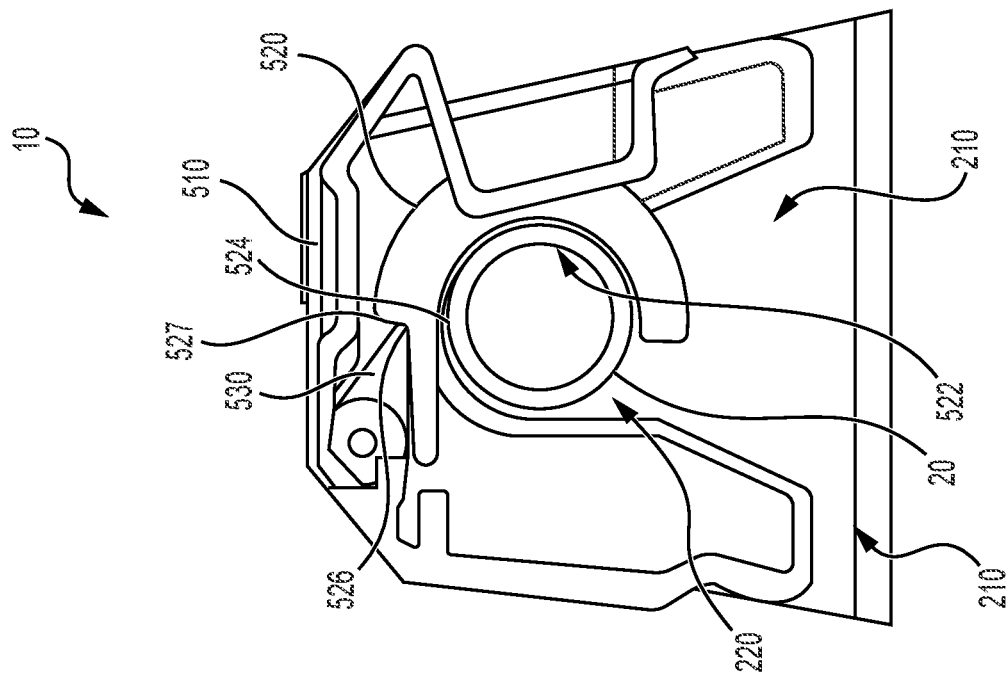
FIG. 7B is a cross-sectional view of the latching device of FIG. 7A when the latching device is latched to the support member.
Figure 7A:
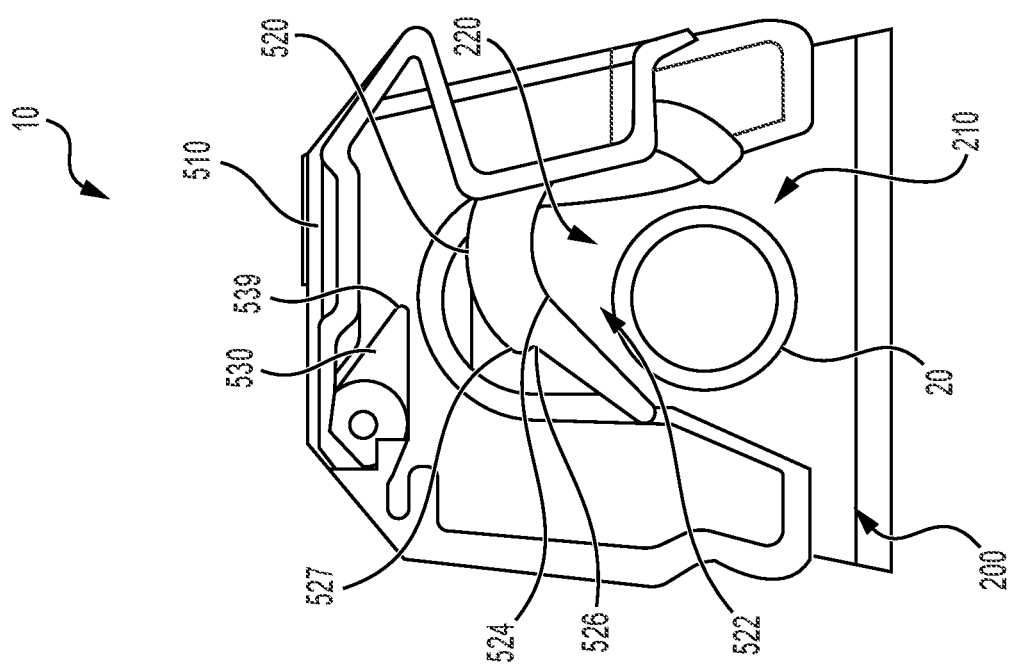
FIG. 7A is a cross-sectional view of the latching device of FIG. 1 taken across a longitudinal center plane 8-8 of FIG. 2, when the latching device is guided by a first recess portion of the housing for latching the latching device to the support member.
Figure 7E:
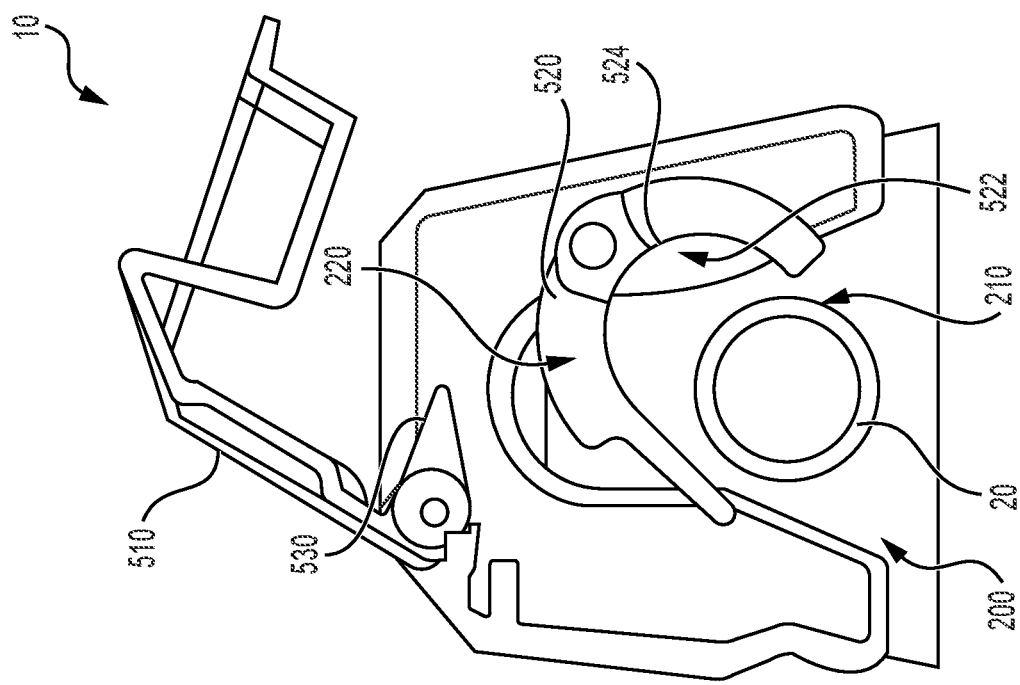
FIG. 7E is a cross-sectional view of the latching device of FIG. 7A when the latching device is latched to the support member and the rotary actuator of the latching device is in an unsecured position.

The rotary actuator 510 is configured to rotate from a secured position as seen in FIGS. 5 and 6 to an unsecured position (see FIG. 7E). However, as it will be described herein further below, the rotary actuator 510 may find itself in a variety of positions between the secured and unsecured positions. One of the intermediary positions is referred to herein as a "target position" which splits the angular range of movement of the rotary actuator 510 in a first sub-range and a second sub-range.

In this embodiment, the rotary actuator 510 is a rotary lever having a depression 516 and a protrusion 518 which both aid a human operator in actuating the rotary actuator 510. The rotary actuator 510 is operable manually (i.e., without the need for any specialized tool). However, other tool-less rotary actuators are contemplated within the scope of the present technology. Developers of the present technology have realized that a rotary actuator, as opposed to a linear actuator, for example, may be beneficial in reducing the risk of inadvertent unlatching of the latching device 10 during operation, especially when used on a powersport vehicle in rough conditions.

In this embodiment, the rotary actuator 510 has a tab 519 that extends downwardly towards a pawl notch 532 of the rotary pawl 530. The tab 519 is provided for selectively engaging with the pawl notch 532. When the rotary pawl 530 is in the restraining position and the rotary actuator 510 is in the secured position, the tab 519 is spaced apart from the pawl notch 650 by a pre-determined distance 650. It is contemplated that the pre-determined distance 650 may depend on a specific angular range of motion between the secured position and the target position of the rotary actuator 510. As it will be described in greater details herein further below, spacing between the pawl notch 532 and the tab 519 is provided for allowing a range of movement of the rotary actuator 510 between the secured position and the trigger position without inadvertently unlatching the latching device 10 from the support member 20.

Components of the first rotary latching mechanism 500 cooperate for latching the latching device 10 to and releasing the latching device 10 from the support member 20. The rotary jaw 520 is disengaged from the rotary pawl 530 when in the opened position and is engaged with the rotary pawl 530 when in the closed position. When the rotary pawl 530 is in the restraining position and is engaged with the rotary jaw 520, the rotary jaw 530 is prevented from moving from the closed position to the opened position, as seen in FIGS. 5 and 6. However, when the rotary pawl 530 is moved from the restraining position to the releasing position, the rotary pawl 530 is disengaged from the rotary jaw 520 thereby allowing the rotary jaw 520 to move from the closed position to the opened position. When the rotary actuator 510 is moved from the secured position to the unsecured position, the rotary actuator 510 engages the rotary pawl 530 and at least partially transfers the rotational movement to the rotary pawl 530, thereby moving the rotary pawl from the restraining position to the releasing position. In summary, rotational movement of the rotary actuator 510 is at least partially transferred to the rotary pawl 530, which in turn can "catch" or "release" the rotary jaw 520.

Developers of the present technology have devised the latching device 10 such that the cavity edge 524 of the rotary jaw 520 cooperates with the second edge segment 453 of the first lateral wall 102 (and a corresponding second edge segment of the second lateral wall 104) for securing the latching device 10 on the support member 20 when the latching device 10 is latched to the support member 20. As best seen in FIG. 4C, when the rotary 520 jaw is in the closed position and the first portion 21 of the support member 20 is received in the cavity 522 and the second portion 22 of the support member is received in the respective second recess portion 220, the first portion 21 of the support member 20 is engaged with the cavity edge 524 while the second portion 22 of the support member 20 is engaged with the first lateral wall 102. As a result, a larger portion of a peripheral contour of the support member 20 is simultaneously engaged with the latching device 10 when the latching device 10 is latched thereon, thereby optimizing the latching condition of the latching device 10.

Operation of the latching device 10 can be broadly categorized into two phases, a latching phase, and a releasing or unlatching phase. These two phases will now be described in turn with reference to FIGS. 7A to 7E.

As seen in FIG. 7A, the housing 100 is used for guiding the latching device when positioning the latching device 10 relative to the support member 20. The human operator positions the opening 230 of the recess 200 over the support member 20. The first recess portion 210 is then used by the human operator for funneling the support member in the recess 200, and towards the cavity 522 of the rotary jaw 520. At this moment in time, the rotary jaw 520 is in the opened position. Once the support member 20 engages the cavity edge 524 of the rotary jaw 520 in the opened position, the human operator applies enough force for the support member 20 to cause rotation of the rotary jaw 520 from the opened position towards the closed position.

In those embodiments where the rotary jaw 520 is biased towards the opened position by the jaw biasing element, the human operator may need to apply more force on the latching device 10 for the support member 20 to cause rotation of the rotary jaw 520 from the opened position towards the closed position, if compared to the embodiment where the jaw biasing element is omitted.

During the movement of the rotary jaw 520 from the opened position to the closed position, the corner member 527 of the rotary jaw 520 abuts the rotary pawl 530, thereby causing movement of the rotary pawl 530 from the restraining position towards the releasing position. Since the pawl biasing member 534 biases the rotary pawl 530 towards the restraining position, the pawl biasing member 534 returns the rotary pawl 530 back to the restraining position where the rotary pawl 530 is received in the notch 526 of the rotary jaw 520, thereby catching the rotary jaw 520 in the closed position.

In this embodiment, it should be noted that at the same time as the rotary jaw 520 is moved from the opened position to the closed position, the support member 20 is snuggly received in the second recess portion 220 of the recess 200. As best seen in FIG. 7B and FIG. 4C, both the second edge segment 453 and the cavity edge 524 are engaged with the peripheral surface of the support member 20, thereby optimizing the latching condition of the latching device 10. Developers of the present technology have realized that having the first latching mechanism 500 so-cooperating with the housing 100 when the latching device 10 is latched to the support member 20 allows for better security of the latching device 10 on the support member 20, if compared to latching devices where only one of a given housing or a given latching mechanism is engaged with the support member when latched thereto, and/or reduces the risk of inadvertent unlatching of the latching device 10.

It is contemplated that in those embodiments where the rotary jaw 520 and the rotary pawl 530 are biased towards the opened position and the restraining position, respectively, respective biasing elements may facilitate reception of the rotary pawl 530 in the notch 526 for preventing movement of the rotary jaw 520 from the closed position to the opened position.

It should also be noted that actuation of the rotary actuator 510 is not required during the latching phase of the latching device 10. As it will be described in greater details herein further below, as opposed to the unlatching phase for example, the rotary actuator 510 can remain in the secured position during the latching phase without requiring human intervention.

The unlatching phase of the latching device 10 will now be described. With reference to FIG. 7C, the human operator actuates the rotary actuator 510 thereby moving the rotary actuator 510 from the secured position to a given intermediary position preceding the target position. During movement of the rotary actuator 510 from the secured position to the given intermediary position, although the spacing between the tab 519 and the pawl notch 532 has been reduced, the tab 519 and the pawl notch 532 remain disengaged which prevents transfer of rotational movement from the rotary actuator 510 to the rotary pawl 530.

It can be said that the first latching mechanism 500 is configured to provide an angular range of movement of the rotary actuator 510 between the secured position and the trigger position (the range including the given intermediary position of FIG. 7C) without inadvertently unlatching the latching device 10 from the support member 20. Indeed, due to the tab 519 and the pawl notch 529 being spaced apart and disengaged until the rotary actuator 510 is moved to the trigger position, rotational movement of the rotary actuator 510 is not transferred to the rotary pawl 520 when the rotary actuator 510 is moved within this angular range of movement.

In some embodiments, it is contemplated that a "spaced configuration" between the tab 519 and the pawl notch 529 of the first rotary latching mechanism 500 allows to only partially transfer rotational movement of the rotary actuator 510 to the rotary pawl 530—i.e., rotational movement of the rotary actuator 510 from the secured position to the trigger position is not transferred, while rotational movement of the rotary actuator 510 is transferred to the rotary pawl 530 when the rotary actuator 510 is moved beyond the triggering position towards the unsecured position.

In some embodiments, even if the rotary actuator 510 is not in the secured position and is positioned at an intermediate position between the trigger position and the secured position, the latching device 10 is not unlatched from the support member 20.

The human operator further rotates the rotary actuator 510 from the given intermediary position shown in FIG. 7C to the trigger position shown in FIG. 7D. When the rotary actuator 510 is in the trigger position, the tab 519 and the pawl notch 532 are no longer spaced apart and are engaged with one another. In this embodiment, since the rotary pawl 530 is biased towards the restraining position, the human operator may be provided with "feedback" in a form of increased resistance to movement when the rotary actuator 510 reaches the trigger position, as opposed to resistance to movement when the rotary actuator 510 is between the unsecured position and the trigger position. In other words, due to a biasing force applied to the rotary pawl 530 by the pawl biasing element 534, once the rotary actuator 510 reaches the trigger position, the human operator needs to apply comparatively more force on the rotary actuator 510 for further rotating the rotary actuator 510 beyond the trigger position.

When the rotary actuator 510 is moved beyond the trigger position, rotational movement of the rotary actuator 510 is transferred to the rotary pawl 530 due to an engagement interface including the tab 519 and the pawl notch 532. As a result, as seen in FIG. 7E, the rotary pawl 530 is moved from the restraining position to the releasing position. When the rotary pawl 530 is moved from the restraining position to the releasing position, the rotary jaw 520 is released from the closed position and can now rotate back to its opened position.

In those embodiments where the rotary jaw 520 is biased towards the opened position by the jaw biasing element, the force applied by the jaw biasing element onto the rotary jaw 520 may aid in ejecting the support member 20 from the second recess portion 220.

Once the latching device 10 is unlatched from the support member 20, the latching device 10 can be re-latched to the support member 20. To that end, the human operator needs to re-position the rotary actuator 510 in any position between the secured position and the trigger position, so that the rotary pawl 530 returns to its restraining position. Then, the re-latching phase may be performed similarly to what is depicted in FIGS. 7A and 7B without departing from the scope of the present technology.

It should be noted that in some embodiments of the present technology, once the latching device 10 is unlatched from the support member 20, the recessed walls of the latching device 10 may still be engaged with the support member 20, thereby retaining the latching device 10 on the support member 20. As such, even if the latching device 10 is inadvertently unlatched from the support member 20, the latching device 10 may remain in place due to the recessed configuration of the housing 100. It is contemplated that the recessed configuration of the housing 100 may prevent an associated accessory from being disconnected from a vehicle when the latching device 10 is inadvertently unlatched from the support member 20.

It is appreciated that these aspects of the present technology collaborate to provide an optimal latching condition, without material variation between the different configurations of the latching device 10. The various components of the latching device 10 are made of conventional materials (e.g., metallic materials, such as steel or aluminum, non-metallic material, such as plastics, and/or composite materials) via conventional manufacturing processes (e.g., casting, molding, 3d printing, etc.). The present technology does not require any specific materials nor methods of manufacture. The present technology merely requires that each component be suitable for the purpose for which it is intended and the use to which it is to be put. Any material(s) or method(s) of manufacture which produce such components may be used in the present technology.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A latching device for releasably latching to a support member, the latching device comprising:
 a housing including a first lateral wall, a second lateral wall, and a transverse wall extending between the first lateral wall and the second lateral wall,
  the first lateral wall and the second lateral wall defining respective recesses with a first recess portion and a second recess portion,
   the first recess portion having a first width and the second recess portion having a second width, the first width being larger than the second width,
   the first recess portion being configured for guiding the latching device when positioning the latching device relative to the support member,
   the second recess portion being shaped for receiving the support member when the latching device is latched to the support member; and
 a rotary latching mechanism including:
  a rotary jaw disposed in the housing between the first lateral wall and the second lateral wall, the rotary jaw for selectively receiving the support member;
  a rotary pawl disposed in the housing between the first lateral wall and the second lateral wall, the rotary pawl for selectively engaging the rotary jaw to latch and release the latching device to and from the support member;
  the rotary jaw being configured to rotate between an opened position and a closed position, the rotary pawl being configured to rotate between a restraining position and a releasing position,
  the rotary jaw being disengaged from the rotary pawl when in the opened position and engaged with the rotary pawl when in the closed position,
  when the rotary pawl is in the restraining position and is engaged with the rotary jaw, the rotary jaw is prevented from moving from the closed position to the opened position,
  when the rotary pawl is moved from the restraining position to the releasing position, the rotary pawl is disengaged from the rotary jaw thereby allowing the rotary jaw to move from the closed position to the opened position;

a rotary actuator for at least partially transferring rotational movement to the rotary pawl;
the rotary actuator being configured to rotate from a secured position to an unsecured position,
when the rotary actuator is moved from the secured position to the unsecured position, the rotary actuator engages the rotary pawl and at least partially transfers the rotational movement to the rotary pawl,
thereby moving the rotary pawl from the restraining position to the releasing position.

2. The latching device of claim 1, wherein the first recess portion tapers from an opening formed by the respective recess towards the second recess portion.

3. The latching device of claim 1, wherein the housing forms a transverse channel having ends corresponding to the respective recesses.

4. The latching device of claim 1, wherein the second recess portion is shaped for snuggly receiving the support member when the latching device is latched to the support member.

5. The latching device of claim 1, wherein the second recess portions have a first height, the support member having a second height, the first height being at least half of the second height for retaining the latching device on the support member when the latching device is inadvertently unlatched from the support member.

6. The latching device of claim 1, wherein the positioning the latching device relative to the support member is performed by a human operator, and wherein the rotational movement is caused by the human operator.

7. The latching device of claim 1, wherein the second recess portions are formed by respective recess edges of the first lateral wall and the second lateral wall, the respective recess edges having a complimentary shape to the support member.

8. The latching device of claim 7, wherein the respective recess edges of the first lateral wall and the second lateral wall are covered with a restraining material.

9. The latching device of claim 1, wherein the housing further includes a mounting interface for engaging an accessory.

10. The latching device of claim 1, wherein the support member is an elongated member of a vehicle.

11. The latching device of claim 1, wherein the rotary jaw is configured to rotate about a jaw rotation axis between the opened position and the closed position, the rotary pawl being configured to rotate about a pawl rotation axis between the restraining position and a releasing position, the rotary actuator being configured to rotate about an actuator rotation axis.

12. The latching device of claim 11, wherein the pawl rotation axis and the actuator rotation axis are a same axis.

13. The latching device of claim 1, wherein the rotary jaw has a notch for selectively engaging with the rotary pawl when in the closed position.

14. The latching device of claim 1, wherein the rotary jaw has a cavity for selectively receiving the support member, the cavity having a cavity edge, and
when the rotary jaw is in the closed position and a first portion of the support member is received in the cavity and second portions of the support member are received in the respective second recess portions of the first lateral wall and the second lateral wall:
the first portion of the support member is engaged with the cavity edge while the second portions of the support member are engaged with the respective ones of the first lateral wall and the second lateral wall.

15. The latching device of claim 14, wherein when the first portion of the support member is received by the cavity, half of a peripheral surface of the first portion of the support member is engaged with the cavity edge.

16. The latching device of claim 1, wherein the latching mechanism further includes a jaw biasing element for biasing the rotary jaw towards the opened position.

17. The latching device of claim 1, wherein the rotary pawl has a pawl notch, and the rotary actuator has a tab for selectively engaging with the pawl notch,
when the rotary pawl is in the restraining position and the rotary actuator is in the secured position, the tab is spaced apart from the pawl notch by a pre-determined distance;
when the rotary actuator is moved from the secured position to a trigger position between the secured position and the unsecured position, the tab engages with the pawl notch; and
when the rotary actuator is moved from the trigger position to the unsecured position, the tab transfers rotational movement caused by the operator, for moving the rotary actuator from the trigger position to the unsecured position, to the rotary pawl,
thereby allowing a range of movement of the rotary actuator between the secured position and the trigger position without inadvertently unlatching the latching device from the support member.

18. The latching device of claim 1, wherein the rotary latching mechanism is a first rotary latching mechanism, the latching device further comprising a second rotary latching mechanism disposed in the housing between the first lateral wall and the second lateral wall.

19. The latching device of claim 18, wherein the first rotary latching mechanism and the second rotary latching mechanism share a same rotary actuator.

20. The latching device of claim 1, wherein the rotary actuator is a tool-less rotary actuator.

* * * * *